US010553123B2

(12) United States Patent
Pesik et al.

(10) Patent No.: US 10,553,123 B2
(45) Date of Patent: Feb. 4, 2020

(54) DETERMINATION OF COLLISION RISKS BETWEEN A TAXIING AIRCRAFT AND OBJECTS EXTERNAL TO THE TAXIING AIRCRAFT (71) Applicant: Simmonds Precision Products, Inc., Vergennes, VT (US)

(72) Inventors: Joseph T. Pesik, Eagan, MN (US); David Matty, Rosemount, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 15/815,654

(22) Filed: Nov. 16, 2017

(65) Prior Publication Data
US 2019/0146083 A1    May 16, 2019

(51) Int. Cl.
*G08G 5/04* (2006.01)
*G01S 13/93* (2006.01)
(Continued)

(52) U.S. Cl.
CPC .......... *G08G 5/045* (2013.01); *G01S 13/9303* (2013.01); *G08G 5/0021* (2013.01);
(Continued)

(58) Field of Classification Search
CPC ..................................................... G08G 5/065
See application file for complete search history.

(56) References Cited

U.S. PATENT DOCUMENTS 6,405,975 B1    6/2002  Sankrithi et al.
6,571,166 B1    5/2003  Johnson et al.
(Continued)

FOREIGN PATENT DOCUMENTS

CA    2464791 A1    10/2004
CA    2737189 A1    10/2011
(Continued)

OTHER PUBLICATIONS

Zacharias, G. L., & Gonsalves, P. G. (1992). Design for Tactical Situation Awareness Display (No. R89351). Charles River Analytics Inc Cambridge MA. (Year: 1992) pp. 1-88.*
(Continued)

*Primary Examiner* — Thomas G Black
*Assistant Examiner* — Ana D Thomas
(74) *Attorney, Agent, or Firm* — Kinney & Lange, P.A.

(57) ABSTRACT

Apparatus and associated methods relate to determining a measure of collision risk between a taxiing aircraft and an object external to the taxiing aircraft. The measure of collision risk is determined using the dynamics of both the taxiing aircraft and the external object. The taxiing aircraft's dynamics can be determined based on collected position, heading, and ground-speed data. The external object's dynamics can be determined based on location data tracked by an object tracking system, for example. A measure of collision risk is calculated, based on the determined dynamics of both the taxiing aircraft and the external object. In some embodiments, image data of an area external to and including the taxiing aircraft is formed. The image data can be annotated with the calculated collision risks and/or indicia of regions of the taxiing aircraft and/or the external objects associated with the collision risks.

16 Claims, 8 Drawing Sheets

(51) Int. Cl.
*G08G 5/06* (2006.01)
*G08G 5/00* (2006.01)
*B64D 47/08* (2006.01)
*B64C 25/44* (2006.01)

(52) U.S. Cl.
CPC .............. *G08G 5/065* (2013.01); *B64C 25/44* (2013.01); *B64D 47/08* (2013.01)

(56) References Cited

U.S. PATENT DOCUMENTS

| | | |
|---|---|---|
| 7,592,929 B2 | 9/2009 | Pepitone |
| 7,974,773 B1 | 7/2011 | Krenz et al. |
| 9,047,771 B1 | 6/2015 | Thoreen et al. |
| 9,174,746 B1 | 11/2015 | Bell et al. |
| 9,245,450 B1 | 1/2016 | Chiew et al. |
| 9,355,567 B2 * | 5/2016 | Krishna .................. B64C 25/44 |
| 9,401,094 B2 | 7/2016 | Cros et al. |
| 2007/0241936 A1 | 10/2007 | Arthur et al. |
| 2010/0094487 A1 | 4/2010 | Brinkman |
| 2014/0092206 A1 | 4/2014 | Boucourt et al. |
| 2014/0142838 A1 | 5/2014 | Durand |
| 2015/0045994 A1 | 2/2015 | Krishna et al. |
| 2015/0142214 A1 | 5/2015 | Cox et al. |
| 2016/0171898 A1 | 6/2016 | Silver |
| 2017/0200380 A1 | 7/2017 | Barnes et al. |
| 2017/0301250 A1 | 10/2017 | Ell et al. |
| 2017/0334578 A1 | 11/2017 | Fleck et al. |
| 2018/0090019 A1 * | 3/2018 | Scacchi .................. G01C 23/00 |
| 2018/0261111 A1 * | 9/2018 | Rutkiewicz .............. G08G 5/04 |

FOREIGN PATENT DOCUMENTS

| | | | |
|---|---|---|---|
| CN | 105391975 | A | 3/2016 |
| EP | 0980828 | A1 | 2/2000 |
| EP | 1842772 | A2 | 10/2007 |
| EP | 1927965 | A2 | 6/2008 |
| EP | 2426461 | A2 | 3/2012 |
| EP | 2495168 | A1 | 9/2012 |
| EP | 2565861 | A2 | 3/2013 |
| EP | 2685442 | A2 | 1/2014 |
| FR | 3020042 | A1 | 10/2015 |
| WO | 2009010969 | A2 | 1/2009 |
| WO | 2015134078 | A2 | 9/2015 |
| WO | 2016162297 | A1 | 10/2016 |

OTHER PUBLICATIONS

International Civil Aviation Organization, "Aerodrome Standards: Aerodrome Design and Operations", ICAO: Cooperative Development of Operational Safety and Continuing Airworthiness, dated Jul. 1999, 194 pages.

International Civil Aviation Organization, "Airport Markings: ICAO & U.S. Requirements", ICAO: Federal Aviation Administration, dated Jun. 2012, 19 pages.

U.S. Department of Transporation, "Advisory Circular", U.S. DOT: Federal Aviation Administration, dated Sep. 27, 2013, 144 pages.

Xu, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.

Federal Aviation Administration, "A Quick Reference to Airfield Standards", FAA: Southern Region Airports Division, dated Jan. 2018, 69 pages.

Extended European Search Report dated Apr. 12, 2019, received for corresponding European Application No. 18206687.8.

* cited by examiner

DETERMINATION OF COLLISION RISKS BETWEEN A TAXIING AIRCRAFT AND OBJECTS EXTERNAL TO THE TAXIING AIRCRAFT

BACKGROUND

Each year, significant time and money are lost due to commercial aircraft accidents and incidents during ground operations, of which significant portions occur during maneuvers on the taxiways and aprons. During ground operations, aircraft share the taxiways and aprons with other aircraft, fuel vehicles, baggage carrying trains, mobile stairways, and many other objects. Should an aircraft collide with any of such objects, the aircraft and the object with which it collided both would require repair and recertification asserting its capability of operation. Costs associated with such repair and recertification, as well as lost opportunity costs associated with the aircraft and the object with which it collided can be expensive.

There are numerous phases of ground operations that occur for aircraft during arrival to and departure from an airport. The taxi-in (TXI) and taxi-out (TXO) phases, for example, require the aircraft to move between the runway and terminal gates. During powered aircraft ground procedures, the flight crew is located in a central cockpit where they are fairly well positioned to observe objects that are directly in front of the cabin of the aircraft, although forward object distance determination can still be challenging. Knowing what is going on near the aircraft wingtips can be even a greater challenge. The aircraft's wings extend laterally from the cabin in both directions and are typically situated well behind the cockpit, and for many aircraft they extend a great distance from the cabin and are thus out of the field of view of the cabin. Additionally, some commercial planes have engines that hang below the wings of the aircraft. During taxi maneuvers, the wingtips and engine nacelles can be susceptible to obstacle collision. Thus, while under aircraft power, the crew must keep eyes forward, while also protecting aircraft assets that are behind them. This often is a formidable task.

Furthermore, knowing that the host aircraft, as a whole, is on an imminent collision path might not be enough information for the crew to execute a safe maneuver. Due to the large size of commercial aircraft and the lack of agile maneuverability, it would be useful to understand what part of the aircraft is at risk of collision. The primary collision points of an aircraft are the wingtips, tail components and nacelles, but other parts of the aircraft can get impacted as well.

SUMMARY

Apparatus and associated methods relate to a method for determining collision risk(s) between a taxiing aircraft and an object(s) external to the taxiing aircraft. The method includes collecting a first data set indicative of position, heading, and/or ground speed of the taxiing aircraft. Then the method predicts, based on the collected first data set, a future position of the taxiing aircraft at a time interval in the near future. The method includes detecting the object(s) external to the taxiing aircraft. Then the method tracks a location(s), relative to the taxiing aircraft, of the detected object(s) external to the taxiing aircraft. The method then predicts, based on the tracked location(s), a future location(s) of the detected object(s) external to the taxiing aircraft at the time interval in the near future. Then the method determines, based on the predicted future location(s) of the detected object(s) and the future position of the taxiing aircraft at the time interval in the near future, a measure(s) of collision risk.

Some embodiments relate to a system for determining collision risk(s) between a taxiing aircraft and an object(s) external to the taxiing aircraft. The system includes an object detection system configured to mount to the taxiing aircraft, one or more processors, and one or more storage devices. The one or more storage devices are encoded with instructions that, when executed by the one or more processors, cause the system to collect a first data set indicative of position, heading, and ground speed of the taxiing aircraft. The one or more storage devices are encoded with instructions that, when executed by the one or more processors, cause the system to predict, based on the collected first data set, a future position of the taxiing aircraft at a time interval in the near future. The one or more storage devices are encoded with instructions that, when executed by the one or more processors, cause the system to detect, via the object detection system, the object(s) external to the taxiing aircraft. The one or more storage devices are encoded with instructions that, when executed by the one or more processors, cause the system to track a location(s), relative to the taxiing aircraft, of the detected object(s) external to the taxiing aircraft. The one or more storage devices are encoded with instructions that, when executed by the one or more processors, cause the system to predict, based on the tracked location(s), a future location(s) of the detected object(s) external to the taxiing aircraft at the time interval in the near future. The one or more storage devices are encoded with instructions that, when executed by the one or more processors, also cause the system to determine, based on the predicted future location(s) of the detected object(s) and the future position of the taxiing aircraft at the time interval in the near future, a measure(s) of collision risk.

DETAILED DESCRIPTION

Apparatus and associated methods relate to determining a measure of collision risk between a taxiing aircraft and an object external to the taxiing aircraft. The measure of collision risk is determined using the dynamics of both the taxiing aircraft and the external object. The taxiing aircraft's dynamics can be determined based on collected position, heading, and ground-speed data. The external object's dynamics can be determined based on location data tracked by an object tracking system, for example. A measure of collision risk is calculated, based on the determined dynamics of both the taxiing aircraft and the external object. In some embodiments, image data of an area external to and including the taxiing aircraft is formed. The image data can be annotated with the calculated collision risks and/or indicia of regions of the taxiing aircraft and/or the external objects associated with the collision risks.

Figure 1A:
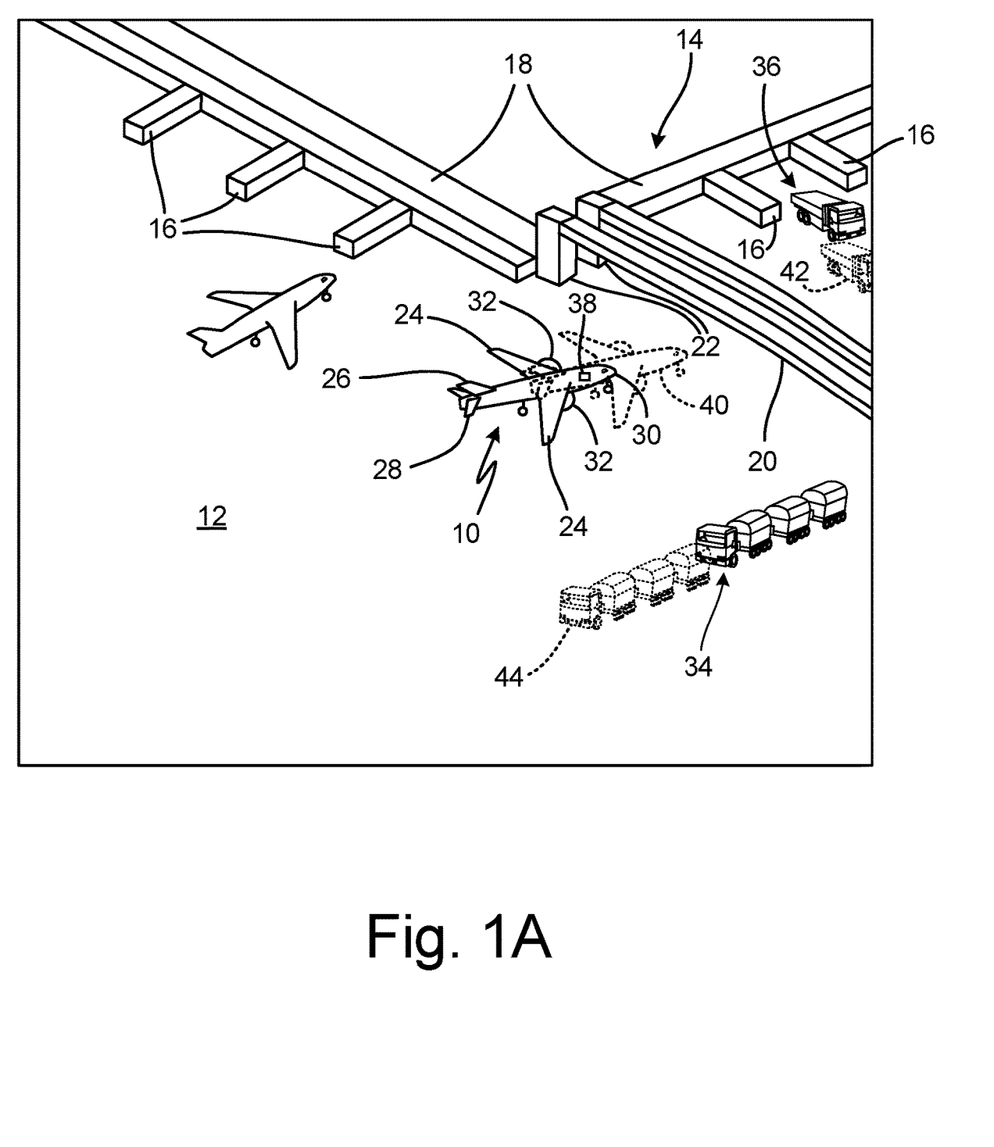
FIGS. 1A-1B are aerial and cockpit perspective views, respectively, of objects in the surrounding environment of a taxiing aircraft.
Figure 1B:
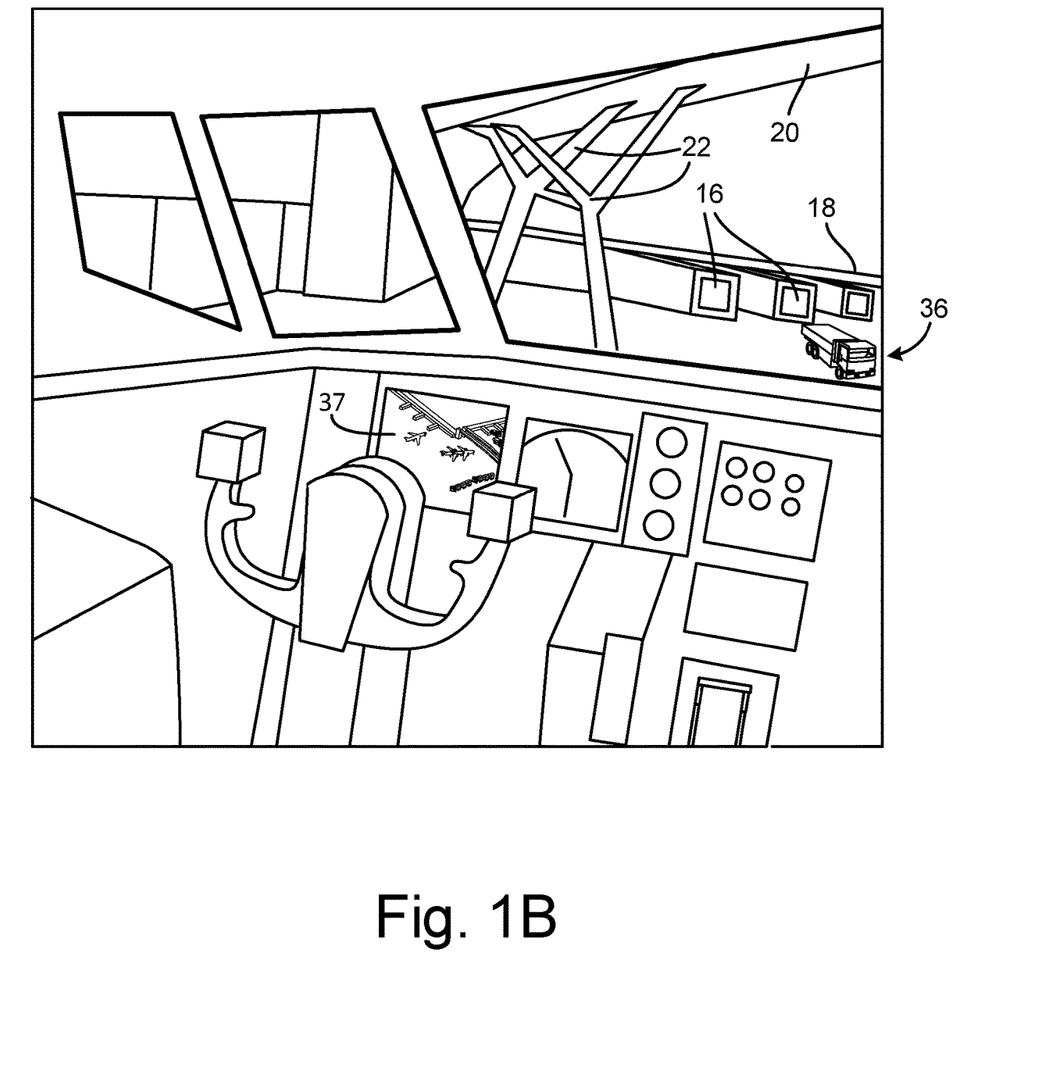

FIGS. 1A-1B are aerial and cockpit perspective views, respectively, of objects in the surrounding environment of a taxiing aircraft. In FIG. 1A, taxiing aircraft 10 is navigating tarmac 12 of airport environment 14. Airport environment 14 includes various static objects and dynamic objects that potentially could impact or be impacted by taxiing aircraft 10. Fixed airport structures are static objects in that their locations are unchanging. These fixed airport structures include, for example, gates 16, concourses 18, and bridge structure 20 supported by bridge piers 22. Also depicted in airport environment 14 are dynamic objects that do not have permanently fixed locations, such as vehicles 34 and 36. Vehicles 34 and 36 are dynamic objects in that their locations can change over time.

Taxiing aircraft 10 has various extremity features that could potentially impact these static objects 16, 18, 20 and 22 and/or dynamic objects 34 and 36 external to taxiing aircraft 10. Such extremity features include wingtips 24, vertical stabilizer 26, horizontal stabilizer 28, nose 30, and engine nacelles 32. These extremity features 24, 26, 28, 30 and 32 approximately define the spatial extent of taxiing aircraft 10. These extremity features 24, 26, 28, 30 and 32 can be at risk of collision with static and/or dynamic objects external to taxiing aircraft 10. To avoid such static objects 16, 18, 20 and 22 and dynamic objects 34 and 36, the pilot of taxiing aircraft 10 should be continually aware of the precise locations of such fixed and/or dynamic objects, relative to taxiing aircraft 10.

To facilitate such awareness, taxiing aircraft 10 is equipped with collision alert system 38 for calculating collision risks and forming image data to display the calculated collision risks. Collision alert system 38 collects position, heading, and/or ground-speed data of taxiing aircraft 10. For example, collision alert system 38 can be configured to interface with an avionics unit(s) of taxiing aircraft 10 to obtain such position, heading, and/or ground-speed data. Collision alert system 38 then predicts, based on the collected position, heading, and/or ground-speed data, a future position 40 (shown in phantom) of taxiing aircraft 10 within a time interval in the near future.

Collision alert system 38 is configured to track fixed objects 16, 18, 20, 22, and/or dynamic objects 34 and 36 external to taxiing aircraft 10. For example, collision alert system 38 can obtain a time sequence of location data of fixed objects 16, 18, 20, 22 and/or dynamic objects 34 and 36. These location data can be assigned time stamps corresponding to an acquisition time of such location data. These location data can be received at various time intervals, and the location data/time stamps can be used to track dynamic objects 34 and 36, for example.

Collision alert system 38 can receive location data of fixed objects 16, 18, 20, 22, and/or dynamic objects 34 and 36 in a variety of manners. For example, taxiing aircraft 10 can be equipped with an external object detector, such as those disclosed by Ell et al. in U.S. patent application Ser. No. 15/385,224, filed Dec. 20, 2016, titled "A Method and System for Aircraft Taxi Strike Alerting," the entire disclosure of which is hereby incorporated by reference. In some embodiments, Automatic Dependent Surveillance Broadcast (ADS-B) systems can be used to provide location data of objects external to taxiing aircraft 10. ADS-B data from ADS-B equipped objects external to taxiing aircraft 10 is transmitted to taxiing aircraft 10 by ADS-B equipped objects external to taxiing aircraft 10. The ADS-B data is indicative of locations of ADS-B equipped objects, such as ADS-B equipped mobile vehicles, for example. The ADS-B data can also be indicative of the type of object that is ADS-B equipped and/or an orientation and/or speed of the ADS-B equipped object.

Collision alert system 38 then tracks locations of detected objects 16, 18, 20, 22, 34 and 36 external to taxiing aircraft 10. Collision alert system 38 then predicts, based on the tracked locations and the corresponding time stamps, future locations 42 and 44 (shown in phantom) of detected objects 16, 18, 20, 22, 34 and 36 external to taxiing aircraft 10 within the time interval in the near future. In the depicted scenario, only mobile vehicles 34 and 36 are predicted to have moved to future locations 44 and 42, respectively, which are different from their present locations.

Collision alert system 38 is configured to determine, based on the predicted future locations of the detected objects and the future position of the taxiing aircraft within the time interval in the near future, measures of collision risk. Collision alert system 38 can be further configured to form a display image for the purpose of providing the determined measures of collision risk associated with each of detected objects 16, 18, 20, 22, 34 and 36 external to taxiing aircraft 10. Such metrics can be, for example, indicative of a time till collision. In some embodiments, such a metric can be, for example, indicative of a predicted minimum separation distance.

In FIG. 1B, the fixed structures and dynamic objects that could potentially be impacted by taxiing aircraft 10, which are depicted in FIG. 1A, are shown from the viewpoint of a pilot seated in the cockpit of taxiing aircraft 10. The depicted view from the cockpit, as shown in FIG. 1B, is much more limited than the aerial perspective view shown in FIG. 1A. Some of gates 16, concourses 18, and portions of bridge structure 20 supported by bridge piers 22 can be seen from the cockpit perspective, as can mobile vehicle 36. Other gates, concourses, portions of the bridge structure and mobile vehicles, such as mobile vehicle 34, cannot be seen from the cockpit perspective. Extremity features of taxiing aircraft 10, such as wingtips 24, vertical stabilizer 26, horizontal stabilizer 28, nose 30 and engine nacelles 32 (depicted in FIG. 1A) also are not visible from the cockpit perspective shown in FIG. 1B. Because extremity structures 24, 26, 28, 30 and 32 cannot be readily seen by the pilot, it can be difficult for a pilot to gauge whether such extremity structures 24, 26, 28, 30 and 32 are on a collision trajectory with one or more of the structures and objects external to taxiing aircraft 10.

To facilitate the pilot's awareness of the determined collision risks, display device 37 is configured to receive the image data formed by collision alert system 38. Display device 37 can have user input controls configured to permit the pilot to configure the image and/or information displayed on display device 37. The pilot can, for example, select from various manners in which the collision risks can be presented in the display. Various types of views (e.g. perspective views, plan views, etc.) of an area external to and including taxiing aircraft 10 can be presented. Various indicia of the current velocities of mobile vehicles 34 and 36 can be displayed. Various indicia of predicted future locations of taxiing aircraft 10 and mobile vehicles 34 and 36 can be presented. Also, various indicia of regions that have a high measure of collision risk of taxiing aircraft 10 and/or detected objects 16, 18, 20, 22, 34 and 36 external to taxiing aircraft 10 can be displayed.

Figure 2A:
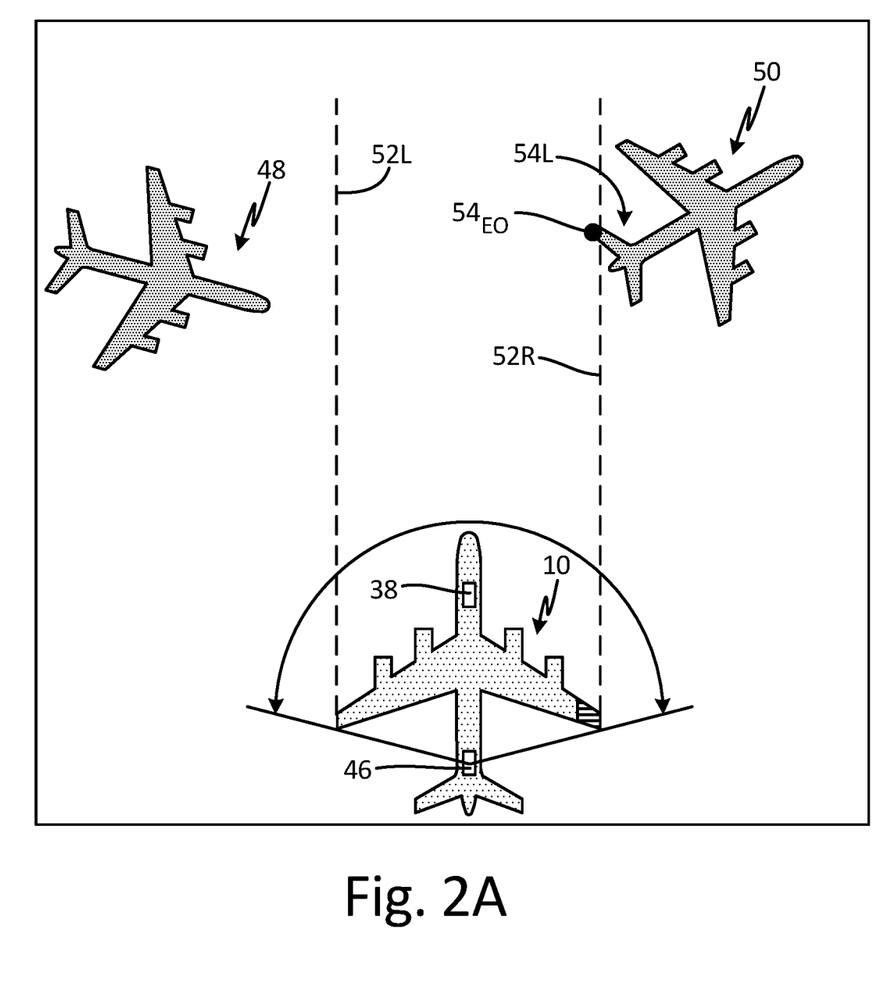
FIGS. 2A-2B are plan views of a taxiing aircraft scenario and a corresponding display image indicating a collision risk.
Figure 2B:
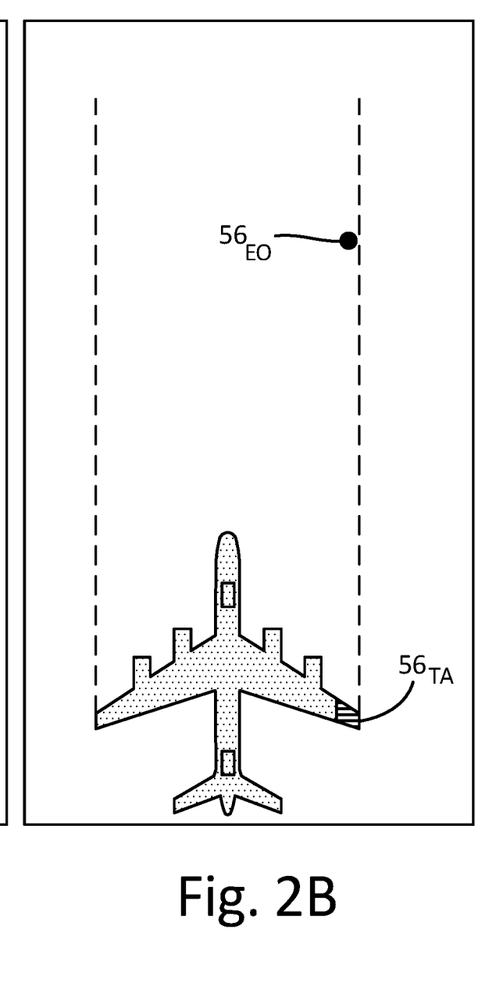

FIGS. 2A-2B are plan views of a taxiing aircraft scenario and a corresponding display image indicating a collision risk. In FIG. 2A, taxiing aircraft 10 is shown equipped with collision alert system 38 and external object detection system 46. Two external objects, aircraft 48 and 50, are within the field of view of external object detection system 46. In some embodiments, external object detection system 46 cannot identify the specific nature of the detected objects. In some embodiments, external object detection system 46 can include data identifying the objects nature (e.g., aircraft, baggage truck, etc.). Collision alert system 38 receives location data and tracks the locations of the objects detected by eternal object detection system 46. Collision alert system 38 can then predict future location of the detected object, based on the tracked locations of the detected objects.

Collision alert system 38 also collects position, heading, and/or ground-speed data from various avionics of taxiing aircraft 10. Collision alert system 38 predicts, based on the collected position, heading, and/or ground-speed data, a path of travel of taxiing aircraft 10, as indicated by wingtip path lines 52L and 52R. Wingtip path 52R is depicted as intersecting detected object $54_{EO}$ (e.g., EO subscript designates an External Object), which is a region of left horizontal stabilizer 54L of aircraft 50. If aircraft 50 is parked or is otherwise motionless, then taxiing aircraft 10 is on a collision path with left horizontal stabilizer 54L of aircraft 50.

In FIG. 2B, a display image (e.g., a plan view) of the FIG. 2A taxiing aircraft scenario is shown. Taxiing aircraft 10 and wingtip path lines 52L and 52R are rendered in the image data used for the display image. Also rendered in the image data are indicia $56_{EO}$ and $56_{TA}$ (e.g., TA subscript designates a member of Taxiing Aircraft 10) of regions of external object (i.e., aircraft 50) and taxiing aircraft 10, respectively, which are at risk of colliding with one another. The feature or region of the right wing of taxiing aircraft 10 has been indicated by index $56_{TA}$ so as to indicate that such a highlighted region is on a collision path with detected object $54_{EO}$. Similarly, index $56_{EO}$ is rendered in the display image to indicate the feature or region of the detected object (i.e., left horizontal stabilizer 54L) with which taxiing aircraft 10 is on a collision path.

Figure 3:
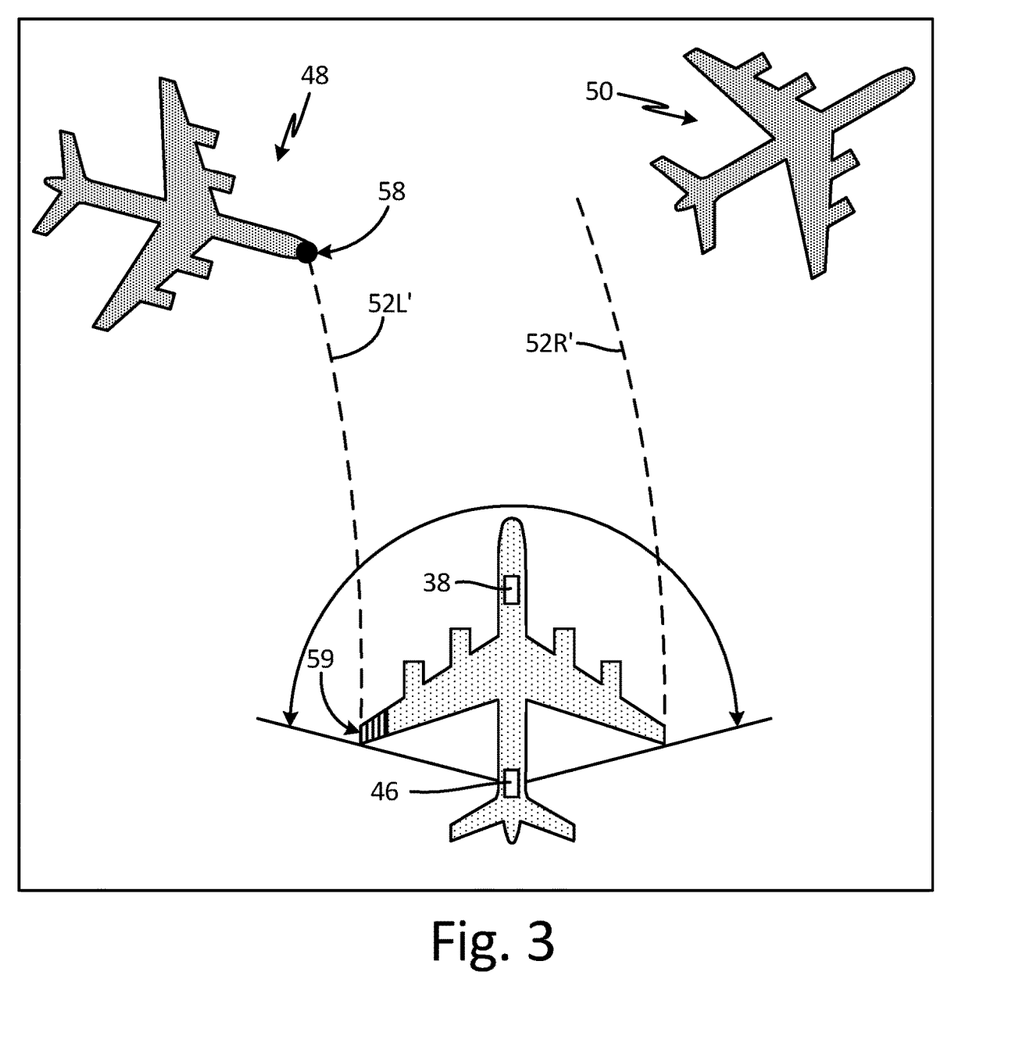
FIG. 3 is a plan view of a taxiing aircraft scenario and with a predicted curved path of the taxing aircraft.

FIG. 3 is a plan view of a taxiing aircraft scenario and with a predicted curve path of the taxing aircraft. In FIG. 3, taxiing aircraft 10 is again shown equipped with collision alert system 38 and external object detection system 46. External object detection system 46 has detected external object 58 (i.e., nose of aircraft 48). And again, collision alert system 38 has collected position, heading, and/or ground-speed data from various avionics of taxiing aircraft 10. In the FIG. 3 scenario, however, collision alert system 10 has predicted, based on the collected position, heading, and/or ground-speed data, a curved path of travel of taxiing aircraft 10 as indicated by wingtip path lines 52L' and 52R'. Wingtip path 52L' is depicted as intersecting detected object 58 (i.e., nose of aircraft 48). If aircraft 48 is parked or is otherwise motionless, then taxiing aircraft 10 is on a collision path with nose 58 of aircraft 48. Left wing 59 of taxiing aircraft 10 is at risk of collision with nose 58 of detected aircraft 48 if the predicted path as indicated by wingtip path lines 52L' and 52R' is traveled. Comparing taxiing aircraft scenarios as depicted in FIGS. 2A and 3 highlights the importance of accurate prediction of the paths of taxiing aircraft 10 and external objects 48 and 50.

Figure 4A:
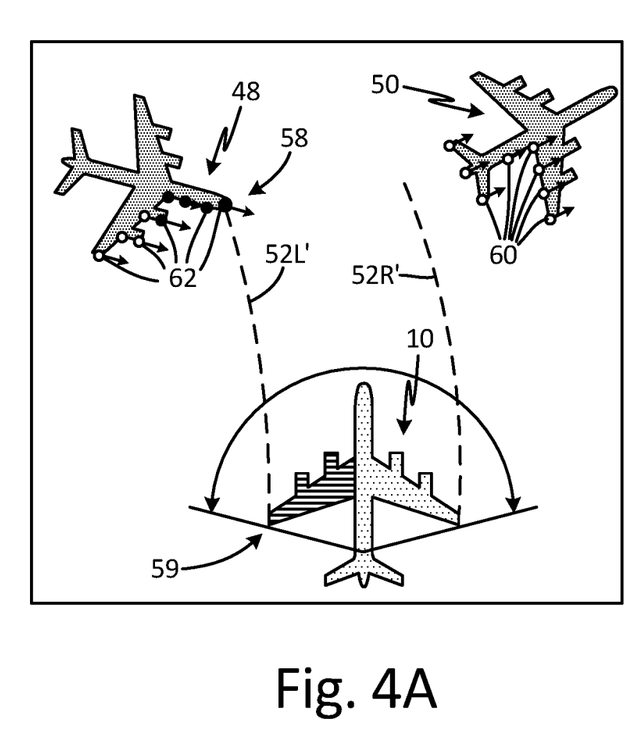
FIGS. 4A-4B are plan views of a taxiing aircraft scenario and a corresponding display image indicating a collision risk calculated using velocity data of detected external objects.
Figure 4B:
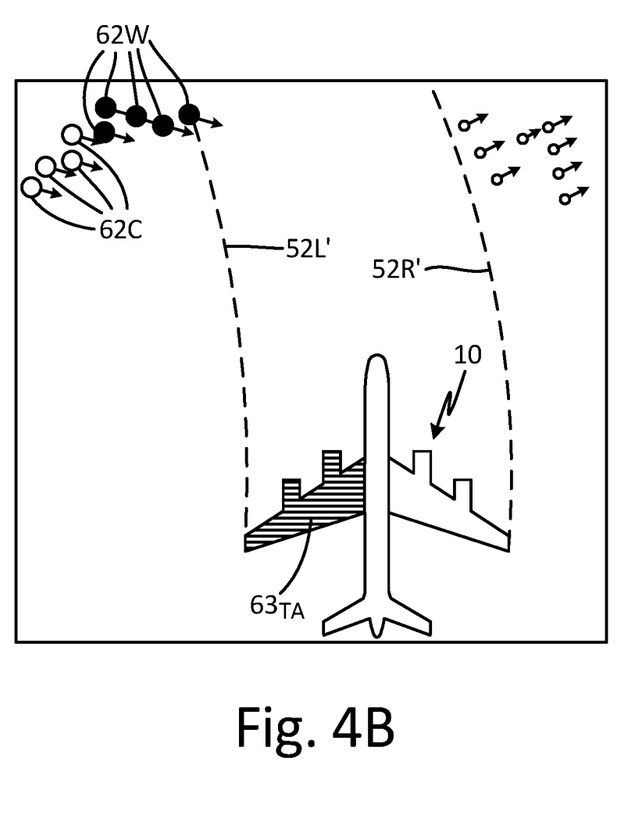

FIGS. 4A-4B are plan views of a taxiing aircraft scenario and a corresponding display image indicating a collision risk calculated using velocity data of detected external objects. In FIG. 4A, taxiing aircraft 10 is again shown along with a predicted path as indicated by wingtip paths 52L' and 52R'. Detected aircraft 48 and 50 have velocity vectors associated with each of tracked regions 62 and 60, respectively, of detected aircraft 48 and 50, annotated thereto. Aircraft 50 in the FIG. 4A scenario is predicted not to eclipse the predicted path of taxiing aircraft 10. This is because aircraft 50 is traveling, as indicated by velocity vectors associated with tracked regions 60, in a direction away from the predicted path of taxiing aircraft 10 as indicated by wingtip paths 52L' and 52R'.

Aircraft 48, however, has been predicted to intersect the path of taxiing aircraft 10. Detected aircraft 48 has a velocity as indicated by velocity vectors associated with tracked regions 62, more regions of aircraft 48 are predicted to intersect the the predicted path of taxiing aircraft 10 than in the FIG. 3 scenario. Aircraft 48 is traveling, as indicated by velocity vector associated with tracked regions 62, into the predicted path of taxiing aircraft 10 as indicated by wingtip paths 52L' and 52R'. A large region of left wing 59 of taxiing aircraft 10 is at risk of collision with aircraft 48 because at some of tracked regions 62 of aircraft 48 has a velocity directed into the predicted path of taxiing aircraft 10.

In FIG. 4B, a display view (e.g., a plan view) of the FIG. 4A taxiing aircraft scenario is shown. Taxiing aircraft 10 and wingtip path lines 52L' and 52R' are rendered in the display view. Also rendered in the display image are velocity vectors associated with tracked regions 62W and 62C, as differentiated by a difference in shading one from the other. Velocity vectors associated with tracked region 62W (e.g., W indicates Warning) emanate from filled circles to indicate that these vectors correspond to portions or regions of detected object 48 that are predicted to collide with taxiing aircraft 10 if the predicted paths (e.g., predicted future locations) of both detected object 48 and taxiing aircraft 10 are accurate and/or remain unchanged. If measures of collision risk associated with the regions of detected object 48 corresponding to velocity vectors associated with tracked regions 62W exceed a first predetermined value, velocity vectors associated with tracked region 62W can be shaded to indicate warning, for example.

Velocity vectors associated with tracked regions 62C (e.g., C indicates Caution) emanate from open circles to indicate that these vectors correspond to portions or regions of detected object 48 that are predicted to nearly collide with or be in close proximity to taxiing aircraft 10 if the predicted paths (e.g., predicted future locations) of both detected object 48 and taxiing aircraft 10 are accurate and/or remain unchanged. If measures of collision risk associated with the regions of detected object 48 corresponding to velocity vectors associated with tracked regions 62C exceed a second predetermined value and are less than the first predetermined value, velocity vectors associated with tracked regions 62C can be shaded to indicate caution, for example.

Figure 5A:
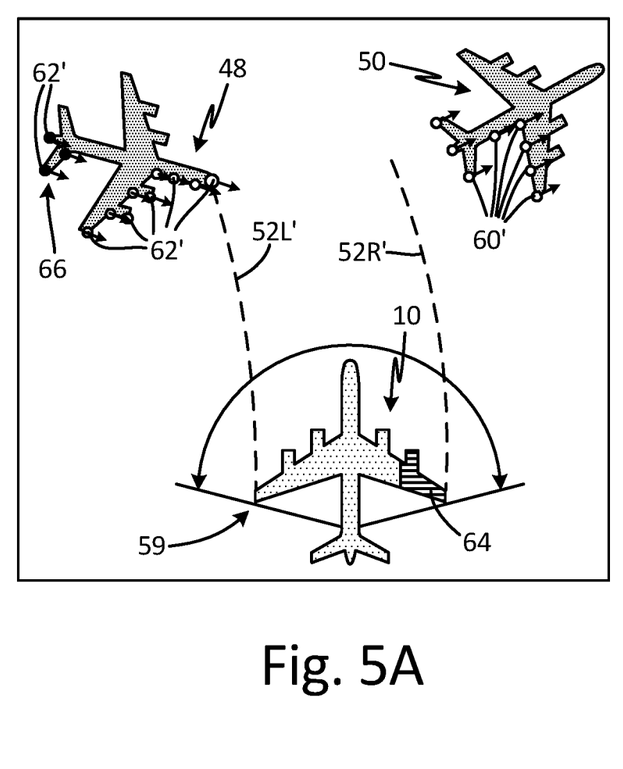
FIGS. 5A-5B are plan views of a taxiing aircraft scenario and a corresponding display image indicating a collision risk calculated using velocity data of detected external objects.
Figure 5B:
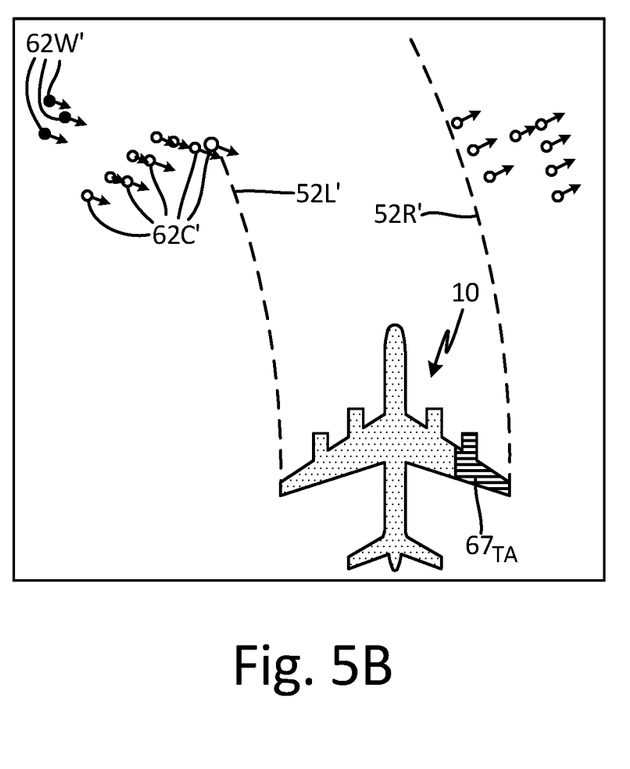

Also indicated on the rendered image is region $63_{TA}$ of left wing 59 that is on a collision path with tracked region 62W of detected object 48. Region $63_{TA}$ can be shaded to indicate Caution or Warning in a manner similar to or the same as is used for shading velocity vectors associated with tracked regions 62W and 62C. For example, if a measure of collision risk of region $63_{TA}$ exceeds the first predetermined value, region $63_{TA}$ can be shaded to indicate warning. If the measure of collision risk of region $63_{TA}$ exceeds a second predetermined value and is less than the first predetermined value, region $63_{TA}$ can be shaded to indicate caution. Further, region $63_{TA}$ may be divided so as to indicate both warning and caution sections FIGS. 5A-5B are plan views of a taxiing aircraft scenario and a corresponding display image indicating a collision risk calculated using velocity data of detected external objects. In FIG. 5A, taxiing aircraft 10 is again shown along with a predicted path as indicated by wingtip paths 52L' and 52R'. The FIG. 5A scenario differs from the FIG. 4A scenario in that the velocity of aircraft 48 is different in the two scenarios. The external object detector tracks detected objects 48 and 50. For example, the external object detector can detect the locations of external objects 48 and 50 at a sequence of times. The external object detector can then calculate a path of travel for each of external objects 48 and 50, based on the time/location data (e.g., tracked locations). In the FIG. 5A embodiment, aircraft 48 has a velocity, as indicated by velocity vectors associated with tracked regions 62', which is greater than that of the velocity vectors associated with tracked regions 62 shown in the FIG. 4A scenario.

The velocity of aircraft 48, as indicated by velocity vectors associated with tracked regions 62', is so large that aircraft 48 is predicted to almost completely traverse the predicted path of taxiing aircraft 10 before colliding with taxiing aircraft 10. The collision alert system of taxiing aircraft 10 has predicted that right wing 64 of taxiing aircraft 10 is on a collision path with tracked regions 62' corresponding to tail 66 of aircraft 48.

In FIG. 5B, a display view (e.g., plan view) of the FIG. 5A taxiing aircraft scenario is shown. Taxiing aircraft 10 and wingtip path lines 52L' and 52R' are rendered in the display view. Also rendered in the display image are velocity vectors associated with tracked regions 62W' and 62C', as differentiated by a difference in shading one from the other. Velocity vectors associated with tracked regions 62W' (e.g., W indicates Warning) are shaded to indicate that these vectors correspond to portions or regions of detected object 48 that are predicted to collide with taxiing aircraft 10 if the predicted paths (e.g., predicted future locations) of both detected object 48 and taxiing aircraft 10 are accurate and/or remain unchanged. Velocity vectors associated with tracked regions 62C' (e.g., C indicates Caution) are shaded to indicate that these vectors correspond to portions or regions of detected object 48 that are predicted to nearly collide with or be in close proximity to taxiing aircraft 10 if the predicted paths (e.g., predicted future locations) of both detected object 48 and taxiing aircraft 10 are accurate and/or remain unchanged. Also indicated on the rendered image is region $67_{TA}$ of right wing 64 that is on a collision path with tracked regions 62W' of detected object 48.

Figure 6A:
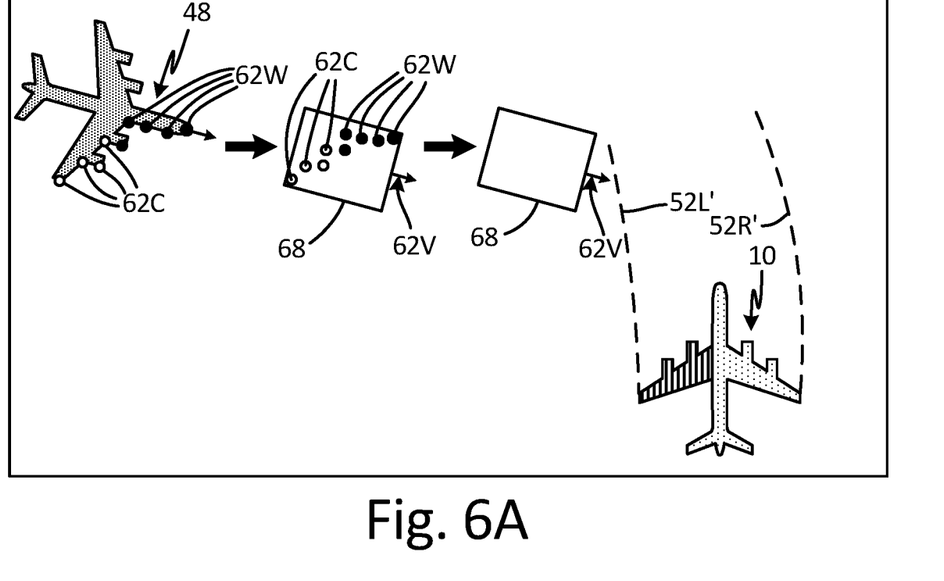
FIGS. 6A-6B are plan views of various display images indicating predicted future locations of a detected external object.
Figure 6B:
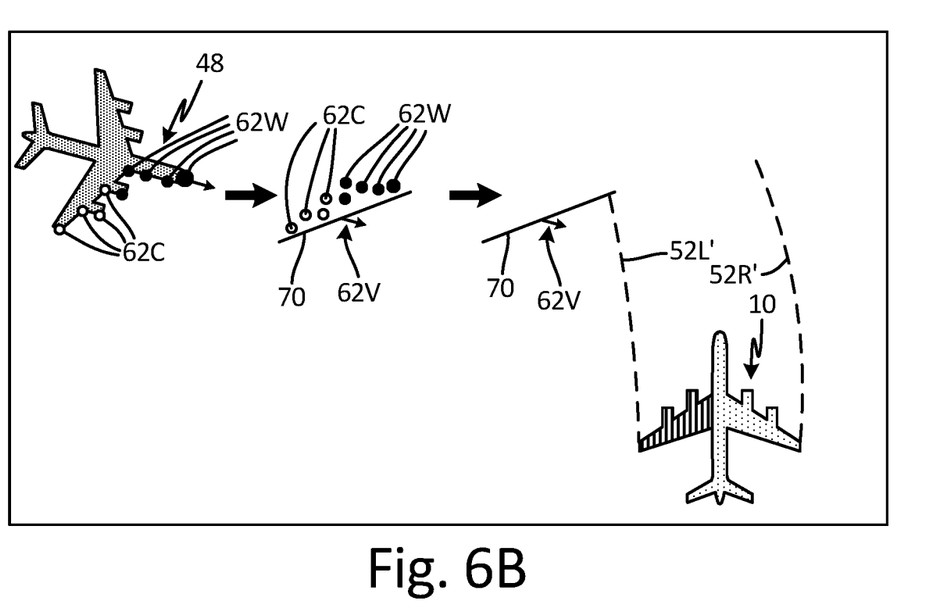

FIGS. 6A-6B are plan views of various display images indicating predicted future locations of a detected external object. In FIG. 6A, aircraft 48 is displayed in various manners. FIGS. 6A-6B are various display images corresponding to the FIG. 4A taxiing scenario. The leftmost depiction shows a silhouette of aircraft 48 with vectors associated with tracked regions 62C and 62W indicating velocities of various regions of aircraft 48. The center depiction shows only region indicia 62C' and 62W' circumscribed by grouping rectangle 68 and vector 62V indicating the common velocity of the regions identified by region indicia 62C' and 62W'. The rightmost depiction shows only the grouping rectangle 68 and vector 62V.

In FIG. 6B, tracked regions 62C and 62W of aircraft 48 are again displayed in various manners. The leftmost depiction again shows a silhouette of aircraft 48 with velocity vectors associated with tracked regions 62C and 62W indicating velocities of the various tracked regions of aircraft 48. The center depiction shows only region indicia 62C' and 62W' bounded by leading edge line segment 70 and vector 62V indicating the common velocity of the regions identified by region indicia 62C' and 62W'. The rightmost depiction shows only the grouping leading edge line segment 70 and vector 62V. Various other manners of displaying detected objects and their velocities can be used.

Various embodiments can form image data in various views. Such systems that facilitate the rendering of image data in various views, for example, are disclosed by Veronesi et al. in U.S. patent application Ser. No. 15/653,205, filed Dec. 20, 2016, titled "Method and System for Rendering and Displaying a Perspective View of Aircraft Taxi Operation," the entire disclosure of which is hereby incorporated by reference.

Figure 7:
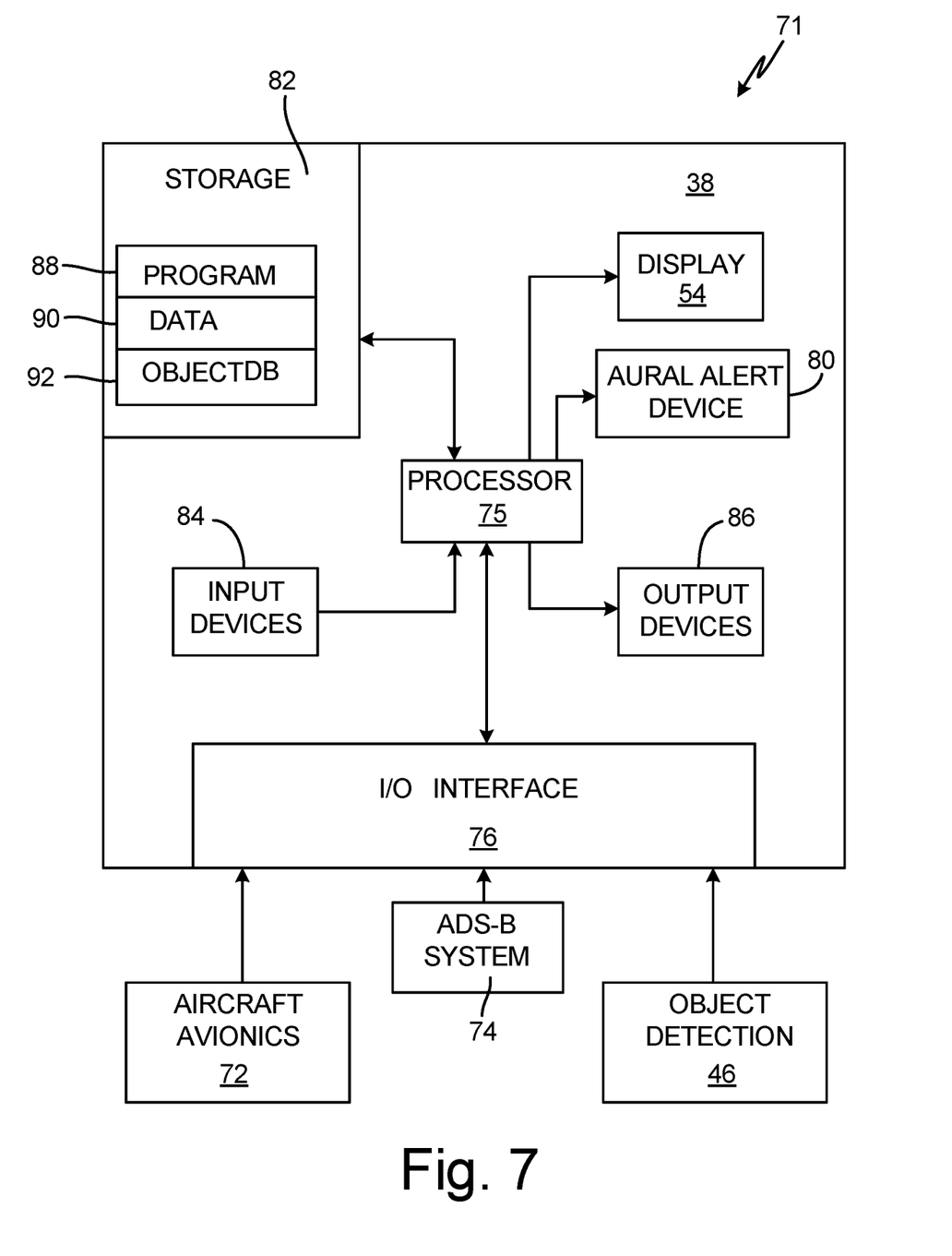
FIG. 7 is a block diagram of an embodiment of a collision alert system.

FIG. 7 is block diagram of an embodiment of system 71 for rendering and displaying a perspective view of aircraft taxi operation and alerting a pilot of potential collisions. In FIG. 7, system 71 for rendering and displaying a perspective view of aircraft taxi operation includes collision alert system 38, aircraft avionics 72, ADS-B interface system 74, and object detection system 46. Collision alert system 38 includes processor(s) 75, input/output interface 76, display device 78, aural alerting device 80, storage device(s) 82, user input devices 84, and user output devices 86. Storage device(s) 82 has various storage or memory locations. Storage device(s) 82 includes program memory 88, data memory 90, and object database 92. In some embodiments, the object database can include dynamic objects and/or fixed objects.

Collision alert system 38 is in communication with aircraft avionics 72, ADS-B interface system 74, and object detection system 46 via input/output interface 76. Aircraft avionics 72 can provide collision alert system 38 with metrics indicative of a taxiing aircraft's location, orientation, speed, etc. ADS-B interface system 74 can transmit and/or receive ADS-B data to and/or from ADS-B equipped objects. Object detection system 46 can provide collision alert system 38 with range, location, orientation and/or velocity data for objects external to the taxiing aircraft. Object detection system 46 can provide, for example, such data for dynamic objects such as other aircraft, aircraft towing vehicles, baggage carts, fuel vehicles, etc.

As illustrated in FIG. 7, collision alert system 38 includes processor(s) 75, input/output interface 76, display device 78, storage device(s) 82, user input devices 84, and user output devices 86. However, in certain examples, collision alert system 38 can include more or fewer components. For instance, in examples where collision alert system 38 is an avionics unit, collision alert system 38 may not include user input devices 84 and/or user output devices 86. In some examples, such as where collision alert system 38 is a mobile or portable device such as a laptop computer, collision alert system 38 may include additional components such as a battery that provides power to components of collision alert system 38 during operation.

Processor(s) 75, in one example, is configured to implement functionality and/or process instructions for execution within collision alert system 38. For instance, processor(s) 75 can be capable of processing instructions stored in storage device(s) 82. Examples of processor(s) 75 can include any one or more of a microprocessor, a controller, a digital signal processor (DSP), an application specific integrated circuit (ASIC), a field-programmable gate array (FPGA), or other equivalent discrete or integrated logic circuitry.

Input/output interface 76, in some examples, includes a communications module. In the embodiment depicted in FIG. 7, input/output interface 76 receives signals from aircraft avionics 72, ADS-B interface system 74, and object detection system 46. In some embodiments, input/output interface 76 can receive signals from other systems. For example, in some embodiments signals can be received from other active aircraft. Such aircraft can send signals that have been generated by collision alert systems associates with such other active aircraft.

Input/output interface 76, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Display device 78 can be used to communicate information between collision alert system 38 and a pilot of the taxiing aircraft. In some embodiments, display device 78 can include a visual display and/or an audible system. The audible system can include a horn and or a speaker. The visual display can use any of CRT, LCD, Plasma, and/or OLED technologies, for example, including an Electronic Flight Bag (EFB) or Primary Flight Display (PFD).

Aural alerting device 80 also can be used to communicate information between collision alert system 38 and a pilot of the taxiing aircraft. In some embodiments, aural alerting device 80 can be a speaker, a bell, a horn, and/or a siren. Various other types of audible systems can be used, such as computer generated speech, etc. For example, in response to detecting objects in the path of the taxiing aircraft, commands and/or warnings such as "stop," "turn right," "turn left," and/or "slow" can be audibly provided to the pilot.

Storage device(s) 82 can be configured to store information within collision alert system 38 during operation. Storage device(s) 82, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 82 is a temporary memory, meaning that a primary purpose of storage device(s) 82 is not long-term storage. Storage device(s) 82, in some examples, is described as volatile memory, meaning that storage device(s) 82 do not maintain stored contents when power to collision alert system 38 is turned off. Examples of volatile memories can include random access memories (RAM), dynamic random access memories (DRAM), static random access memories (SRAM), and other forms of volatile memories. In some examples, storage device(s) 82 is used to store program instructions for execution by processor(s) 75. Storage device(s) 82, in one example, is used by software or applications running on collision alert system 38 (e.g., a software program implementing long-range cloud conditions detection) to temporarily store information during program execution.

Storage device(s) 82, in some examples, also include one or more computer-readable storage media. Storage device(s) 82 can be configured to store larger amounts of information than volatile memory. Storage device(s) 82 can further be configured for long-term storage of information. In some examples, storage device(s) 82 include non-volatile storage elements. Examples of such non-volatile storage elements can include magnetic hard discs, optical discs, flash memories, or forms of electrically programmable memories (EPROM) or electrically erasable and programmable (EEPROM) memories.

User input devices 84, in some examples, are configured to receive input from a user. Examples of user input devices 84 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User output devices 86 can be configured to provide output to a user. Examples of user output devices 86 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

DISCUSSION OF POSSIBLE EMBODIMENTS

The following are non-exclusive descriptions of possible embodiments of the present invention.

Apparatus and associated methods relate to a system for determining collision risk(s) between a taxiing aircraft and an object(s) external to the taxiing aircraft. The system includes an object tracking system configured to mount to the taxiing aircraft, one or more processors, and one or more storage devices. The one or more storage devices are encoded with instructions that, when executed by the one or more processors, cause the system to collect position, heading, and/or ground-speed data of the taxiing aircraft. The one or more storage devices are encoded with instructions that, when executed by the one or more processors, cause the system to predict, based on the collected position, heading, and/or ground-speed data, a future position of the taxiing aircraft within a time interval. The one or more storage devices are encoded with instructions that, when executed by the one or more processors, cause the system to track a location(s) of the object(s) external to the taxiing aircraft. The one or more storage devices are encoded with instructions that, when executed by the one or more processors, cause the system to predict, based on the tracked location(s), a future location(s) of the object(s) external to the taxiing aircraft within the time interval. The one or more storage devices are encoded with instructions that, when executed by the one or more processors, also cause the system to determine, based on the predicted future location(s) of the object(s) and the future position of the taxiing aircraft within the time interval, a measure(s) of collision risk.

The system of the preceding paragraph can optionally include, additionally and/or alternatively, any one or more of the following features, configurations and/or additional components:

A further embodiment of the foregoing system, wherein the one or more storage devices are further encoded with instructions that, when executed by the one or more processors, cause the system to compare the determined measure(s) of collision risk with a predetermined threshold.

A further embodiment of any of the foregoing systems, wherein the one or more storage devices are further encoded with instructions that, when executed by the one or more processors, cause the system to generate an audible alert if the determined measure(s) of collision risk equals or exceeds the predetermined threshold.

A further embodiment of any of the foregoing systems, wherein the one or more storage devices are further encoded with instructions that, when executed by the one or more processors, cause the system to identify a member(s) of the taxiing aircraft associated with the determined measure(s) of collision risk that equals or exceeds the predetermined threshold.

A further embodiment of any of the foregoing systems, wherein the one or more storage devices are further encoded with instructions that, when executed by the one or more processors, cause the system to identify a portion(s) of the object(s) external to the taxiing aircraft associated with determined measure(s) of collision risk that equals or exceeds the predetermined threshold.

A further embodiment of any of the foregoing systems, wherein the one or more storage devices are further encoded with instructions that, when executed by the one or more processors, cause the system to form image data of a view of an area external to and including the taxiing aircraft.

A further embodiment of any of the foregoing systems, wherein the one or more storage devices are further encoded with instructions that, when executed by the one or more processors, cause the system to map into the image data symbols indicative of the object(s) external to the aircraft at the tracked location(s).

A further embodiment of any of the foregoing systems, wherein the one or more storage devices are further encoded with instructions that, when executed by the one or more processors, cause the system to send the image data to a display device configured to display, based on the image data, the view of the area external to and including the taxiing aircraft.

Some embodiments relate to a method for determining collision risk(s) between a taxiing aircraft and an object(s) external to the taxiing aircraft. The method includes collecting position, heading, and/or ground-speed data of the taxiing aircraft. The method includes predicting, based on the collected position, heading, and/or ground-speed data, a future position of the taxiing aircraft within a time interval. The method includes tracking a location(s) of the object(s) external to the taxiing aircraft. The method includes predicting, based on the tracked location(s), a future location(s) of the object(s) external to the taxiing aircraft within the time interval. The method also includes determining, based on the predicted future location(s) of the object(s) and the future position of the taxiing aircraft within the time interval, a measure(s) of collision risk.

The method of the preceding paragraph can optionally include, additionally and/or alternatively, any one or more of the following features, configurations and/or additional components:

A further embodiment of the foregoing method can include comparing the determined measure(s) of collision risk with a predetermined threshold.

A further embodiment of any of the foregoing methods can include generating an audible alert if the determined measure(s) of collision risk equals or exceeds the predetermined threshold.

A further embodiment of any of the foregoing methods can include identifying a member(s) of the taxiing aircraft associated with the determined measure(s) of collision risk that equals or exceeds the predetermined threshold.

A further embodiment of any of the foregoing methods can include identifying a portion(s) of the object(s) external to the taxiing aircraft associated with determined measure(s) of collision risk that equals or exceeds the predetermined threshold.

A further embodiment of any of the foregoing methods can include forming image data of a view of an area external to and including the taxiing aircraft.

A further embodiment of any of the foregoing methods can include mapping into the image data symbols indicative of the object(s) external to the aircraft at the tracked location(s).

A further embodiment of any of the foregoing methods can include mapping into the image data a symbol indicative of the taxiing aircraft.

A further embodiment of any of the foregoing methods can include annotating the image data with the determined measure(s) of collision risk.

A further embodiment of any of the foregoing methods can include comparing the determined measure(s) of collision risk with a predetermined threshold. The method can include identifying a member(s) of the taxiing aircraft associated with the determined measure(s) of collision risk that equals or exceeds the predetermined threshold. The method can also include annotating the image data with indicia of the identified member(s) of the taxiing aircraft A further embodiment of any of the foregoing methods can include comparing the determined measure(s) of collision risk with a predetermined threshold. The method can include identifying a portion(s) of the object(s) external to the taxiing aircraft associated with determined measure(s) of collision risk that equals or exceeds the predetermined threshold. The method can also include annotating the image data with indicia of the identified member(s) of the taxiing aircraft A further embodiment of any of the foregoing methods can include sending the image data to a display device configured to display, based on the image data, the view of the area external to and including the taxiing aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for determining collision risk between a taxiing aircraft and an object external to the taxiing aircraft, the method comprising:
    collecting position, heading, and/or ground-speed data of the taxiing aircraft;
    predicting, based on the collected position, heading, and/or ground-speed data, a future position of the taxiing aircraft within a time interval;
    tracking a location of the object external to the taxiing aircraft;
    predicting, based on the tracked location, a future location of the object external to the taxiing aircraft within the time interval;
    determining, based on the predicted future location of the object and the future position of the taxiing aircraft within the time interval, a measure of collision risk;
    forming image data of a view of an area external to and including the taxiing aircraft;
    mapping into the image data symbols indicative of the object external to the aircraft at the tracked location; and
    annotating the image data with velocity vectors associated with object external to the aircraft.

2. The method of claim 1, further comprising:
    comparing the determined measure of collision risk with a predetermined threshold.

3. The method of claim 2, further comprising:
    generating an audible alert if the determined measure of collision risk equals or exceeds the predetermined threshold.

4. The method of claim 1, further comprising:
    identifying a member of the taxiing aircraft associated with the determined measure of collision risk that equals or exceeds the predetermined threshold.

5. The method of claim 1, further comprising:
    identifying a portion of the object external to the taxiing aircraft associated with determined measure of collision risk that equals or exceeds the predetermined threshold.

6. The method of claim 1, further comprising:
    mapping into the image data a symbol indicative of the taxiing aircraft.

7. The method of claim 1, further comprising:
    annotating the image data with the determined measure of collision risk.

8. The method of claim 1, further comprising:
    comparing the determined measure of collision risk with a predetermined threshold;
    identifying a member of the taxiing aircraft associated with the determined measure of collision risk that equals or exceeds the predetermined threshold; and
    annotating the image data with indicia of the identified member of the taxiing aircraft.

9. The method of claim 1, further comprising:
    comparing the determined measure of collision risk with a predetermined threshold;
    identifying a portion of the object external to the taxiing aircraft associated with determined measure of collision risk that equals or exceeds the predetermined threshold; and
    annotating the image data with indicia of the identified member of the taxiing aircraft.

10. The method of claim 1, further comprising:
    sending the image data to a display device configured to display, based on the image data, the view of the area external to and including the taxiing aircraft.

11. A system for determining collision risk between a taxiing aircraft and an object external to the taxiing aircraft, the system comprising:
    an object tracking system configured to mount to the taxiing aircraft;
    one or more processors; and
    one or more storage devices encoded with instructions that, when executed by the one or more processors, cause the system to:
        collect position, heading, and/or ground-speed data of the taxiing aircraft;
        predict, based on the collected position, heading, and/or ground-speed data, a future position of the taxiing aircraft within a time interval;
        track a location of the object external to the taxiing aircraft;
        predict, based on the tracked location, a future location of the object external to the taxiing aircraft within the time interval;
        determine, based on the predicted future location of the object and the future position of the taxiing aircraft within the time interval, a measure of collision risk;
        form image data of a view of an area external to and including the taxiing aircraft;
        map into the image data symbols indicative of the object external to the aircraft at the tracked location; and
        annotate the image data with velocity vectors associated with object external to the aircraft.

12. The system of claim 11, wherein the one or more storage devices are further encoded with instructions that, when executed by the one or more processors, cause the system to:
    compare the determined measure of collision risk with a predetermined threshold.

13. The system of claim 12, wherein the one or more storage devices are further encoded with instructions that, when executed by the one or more processors, cause the system to:
    generate an audible alert if the determined measure of collision risk equals or exceeds the predetermined threshold.

14. The system of claim 11, wherein the one or more storage devices are further encoded with instructions that, when executed by the one or more processors, cause the system to:
    identify a member of the taxiing aircraft associated with the determined measure of collision risk that equals or exceeds the predetermined threshold.

15. The system of claim 11, wherein the one or more storage devices are further encoded with instructions that, when executed by the one or more processors, cause the system to:
    identify a portion of the object external to the taxiing aircraft associated with determined measure of collision risk that equals or exceeds the predetermined threshold.

16. The system of claim 11, wherein the one or more storage devices are further encoded with instructions that, when executed by the one or more processors, cause the system to:

send the image data to a display device configured to display, based on the image data, the view of the area external to and including the taxiing aircraft.

\* \* \* \* \*